United States Patent
Chew

(10) Patent No.: US 9,612,979 B2
(45) Date of Patent: *Apr. 4, 2017

(54) SCALABLE MEMORY PROTECTION MECHANISM

(75) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/910,279

(22) Filed: Oct. 22, 2010

(65) Prior Publication Data

US 2012/0102576 A1     Apr. 26, 2012

(51) Int. Cl.
*H04L 29/06* (2006.01)
*G06F 12/14* (2006.01)

(52) U.S. Cl.
CPC ................................ *G06F 12/1441* (2013.01)

(58) Field of Classification Search
CPC ............. G06F 11/1016; G06F 11/1028; G06F 11/167; G06F 12/14; G06F 12/1441; G06F 2212/2022; G06F 12/1433; G06F 2212/403; G06F 11/08; G06F 11/1433; G06F 11/1417; G06F 11/1441; G06F 11/102; H04L 63/10
USPC ...................................... 713/194; 726/26–30
See application file for complete search history.

(56) References Cited

U.S. PATENT DOCUMENTS

| | | | | |
|---|---|---|---|---|
| 4,506,362 A | * | 3/1985 | Morley | G06F 11/106 714/6.1 |
| 2005/0160217 A1 | * | 7/2005 | Gonzalez | G06F 11/1068 711/6 |
| 2006/0265636 A1 | * | 11/2006 | Hummler | 714/800 |
| 2007/0101236 A1 | * | 5/2007 | Bauerle et al. | 714/763 |
| 2007/0214349 A1 | * | 9/2007 | Gu et al. | 713/2 |
| 2008/0313453 A1 | * | 12/2008 | Booth | G06F 21/575 713/2 |
| 2009/0007104 A1 | * | 1/2009 | Zimmer | G06F 21/606 718/1 |
| 2009/0138754 A1 | * | 5/2009 | Edwards et al. | 714/6 |
| 2010/0169750 A1 | * | 7/2010 | Chew et al. | 714/807 |
| 2010/0332816 A1 | * | 12/2010 | Murray | 713/2 |
| 2011/0047439 A1 | * | 2/2011 | Jorda et al. | 714/763 |
| 2011/0320685 A1 | * | 12/2011 | Gorobets et al. | 711/103 |

OTHER PUBLICATIONS

Nicholas Nethercote, Julian Seward, "How to Shadow Every Byte of Memory Used by a Program", 2007, ACM 978-1-59593-630-1, pp. 65-74.*

* cited by examiner

*Primary Examiner* — Joseph P Hirl
*Assistant Examiner* — Chi Nguy
(74) *Attorney, Agent, or Firm* — Blakely, Sokoloff, Taylor & Zafman LLP

(57) ABSTRACT

An apparatus to protect contents of a memory region is presented. In one embodiment, the apparatus includes a non-volatile memory, memory check logic to generate check values for protected memory regions, and comparison logic to compare stored check values from the non-volatile memory with generated check values from the memory check logic. The apparatus also includes security logic to prevent executing code in the protected memory regions if the comparison logic detects a mismatch between the stored check values and the generated check values.

16 Claims, 4 Drawing Sheets

SCALABLE MEMORY PROTECTION MECHANISM

FIELD OF THE INVENTION

Embodiments of the invention relate to the field of information processing, and more particularly, to the field of security in information processing systems.

BACKGROUND OF THE INVENTION

Information processing systems typically include a programmable non-volatile memory, such as an electrically erasable programmable read only memory ("EEPROM") or flash memory, for storing a bootstrap loader, a basic input/output system ("BIOS"), and other firmware. The code stored in this non-volatile memory may be modified for updates and patches, but is retained when the system is powered down. Therefore, it may be the target of malicious attacks on the information processing system.

One approach to perform secure boot and secure firmware execution is by computing a boot image of the firmware through hashing/encryption and storing the boot image in a non-volatile memory. During boot up, a boot image computation is performed on the targeted firmware and the result of the computation is compared with the stored boot image to determine whether firmware has been tampered with.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
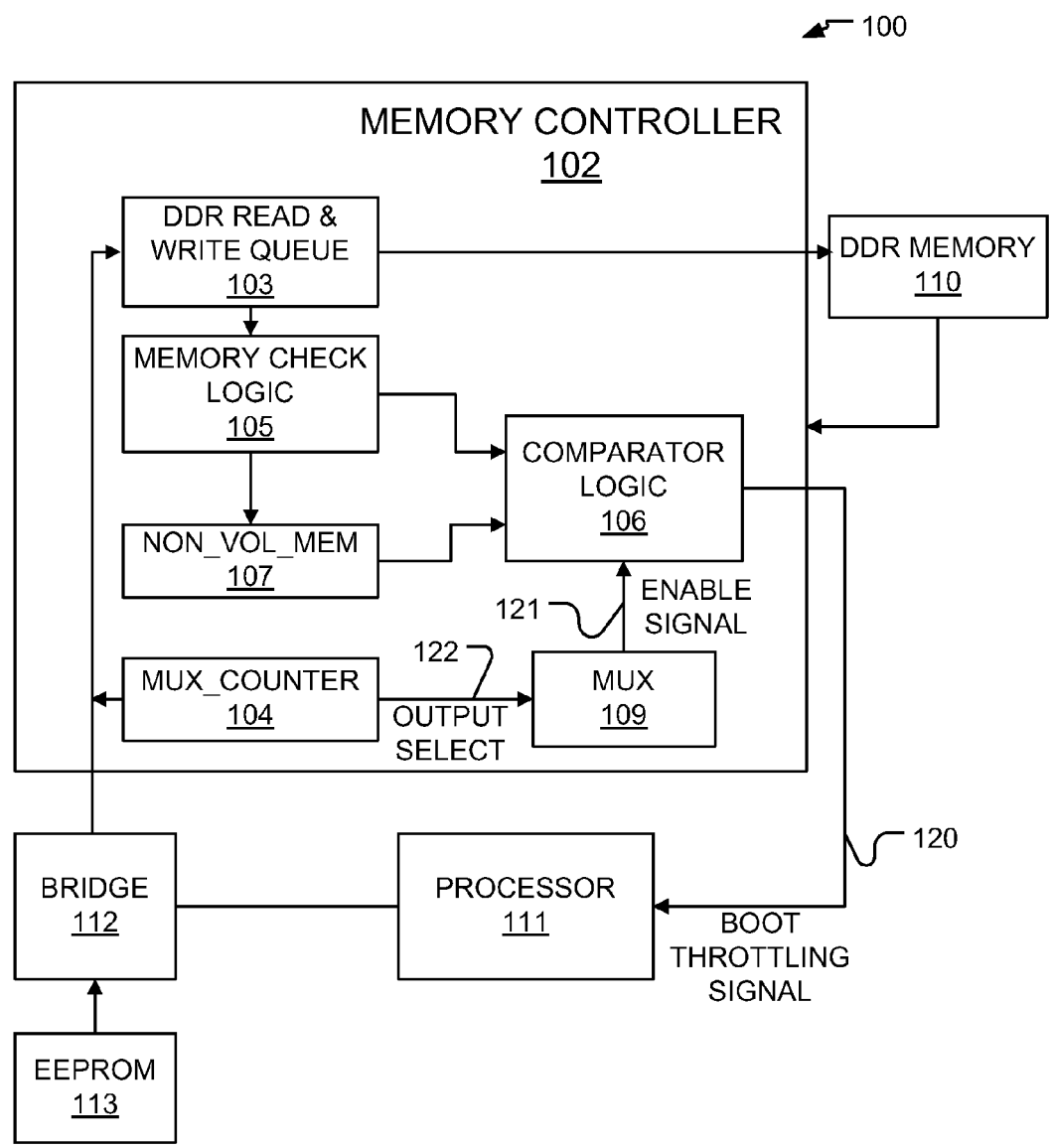
FIG. 1 is a block diagram of a computer system for protecting memory regions in accordance with one embodiment of the invention.

An apparatus to protect contents of a memory region is presented. In one embodiment, the apparatus includes a non-volatile memory, memory check logic to generate check values for protected memory regions, and comparison logic to compare stored check values from the non-volatile memory with generated check values from the memory check logic. The apparatus also includes security logic to prevent executing code in the protected memory regions if the comparison logic detects a mismatch between the stored check values and the generated check values.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

An apparatus to protect contents of a memory region is presented. In one embodiment, the apparatus includes a non-volatile memory, memory check logic to generate check values for protected memory regions, and comparison logic to compare stored check values from the non-volatile memory with generated check values from the memory check logic. The apparatus also includes security logic to prevent executing code in the protected memory regions if the comparison logic detects a mismatch between the stored check values and the generated check values.

FIG. 1 is a block diagram of a computer system for protecting memory regions in accordance with one embodiment of the invention. Many related components such as buses and peripherals have not been shown to avoid obscuring the invention. Referring to FIG. 1, in one embodiment, the computer system includes processor 111, bridge 112, electrically erasable programmable read-only memory (EEPROM) 113, memory controller 102, and DDR memory 110.

In one embodiment, memory controller 102 (e.g., DDR controller) further includes, DDR read and write queue 103, memory check logic 105, non volatile memory 107, comparison logic 106, and security logic (not shown). In one embodiment, memory check logic 105 includes ECC (error-correcting code) logic, multiplexer counter 104, and multiplexer 109.

In one embodiment, the aforementioned units are shown as discrete components. Other embodiments are possible where some or all of these units are integrated within a device or within other components. In other embodiments, the aforementioned units are distributed throughout a system in hardware, software, or some combination thereof.

In one embodiment, processor 111 includes any component having one or more processing cores, where each processing core is based on any of a variety of different types of processors, including a general purpose microprocessor or a special purpose processor or microcontroller, or a reconfigurable core (e.g. a field programmable gate array). Although FIG. 1 shows one such processor 111, the computer system may include any number of processors, each including any number of processing cores and threads, in any combination.

In one embodiment, DDR memory 110 is a system memory. A system memory may include any medium on which information, such as data and/or program code, may be stored, such as static or dynamic random access memory, semiconductor-based read-only or flash memory, magnetic or optical disk memory, or any other type of medium readable by processor 111, or any combination of such media. In one embodiment, DDR memory 110 includes one or more different media, and may be fabricated, packaged, or otherwise arranged as a single memory or multiple distinct memories.

In one embodiment, memory controller 102 includes any circuitry, logic, or other structures to maintain the contents of DDR memory 110, and to support the access to and protection of DDR memory 110.

In one embodiment, non-volatile memory 107 includes any form of non-volatile memory, such as EEPROM or flash memory, a phase change memory (PCM), on which a bootstrap loader, BIOS, or other firmware are stored. In one embodiment, non-volatile memory 107 stores ECC values of the firmware (or a hashed image of the firmware). The hashed image is of a smaller footprint than that of the firmware. The hashed image is an effective checker for the integrity of the firmware. This decreases the required size of non-volatile memory 107 to protect a region of memory. In one embodiment, for example, a 64 Mbytes (MB) of firmware is hashed into an 8 MB image to be stored in non-volatile memory 107 (similar to a 64 MB firmware's ECC values which are about 8 MB, assuming that each 64-bit word of the firmware is associated with an 8-bit ECC value). ECC is an effective method to detect memory data error. In one embodiment, for example, a parity checker is used, whereby one parity bit is associated with N bits of firmware.

In one embodiment, processor 111, DDR memory 110, memory controller 102, and non-volatile memory 107 may be coupled to or communicate with each other according to any known approach, such as directly or indirectly through one or more parallel, sequential, pipelined, asynchronous, synchronous, wired, wireless, or other bus or point-to-point connection.

In one embodiment, DDR memory 110 is logically or physically divided into memory regions. Some of the memory regions are protected memory regions. Each of the one or more protected memory region is associated with a protection setting. The protection setting includes at least an integer value, for example, N. In one embodiment, DDR memory 110 is formatted to include a dedicated firmware shadow region, for use according to embodiments of the present invention.

In one embodiment, memory check logic 105 generates check values (e.g., ECC values) for one or more protected memory regions. Memory check logic 105 computes an ECC value based on data in each memory location. Memory check logic 105 determines which memory region is a protected memory region. In one embodiment, a memory region is protected to maintain the integrity of the firmware or critical operating system codes contained in the memory region during run time.

In one embodiment, comparison logic 106 compares stored check values from the non-volatile memory with generated check values from memory check logic 105. The stored check values are computed, for example, during firmware update.

In one embodiment, when a new code is being loaded into DDR memory 110, stored check values are generated and stored. A new code includes, such as, for example, a firmware update, operating system (OS) kernel, a critical OS segment, a driver, and any combinations thereof. In one embodiment, memory check logic 105 in conjunction with a basic input/output system (BIOS), an OS boot loader, or the AMT manageability engine (ME) initiates a secure system entry protocol to authenticate the new code and checks for system privilege to update the code. After the authentication, non-volatile memory 107 is unlocked. Memory check logic 105 computes an 8-bit ECC value for every N-th memory location (e.g., memory word, memory line, memory block) of the new code. In one embodiment, memory check logic 105 computes ECC values for all memory locations, but only the ECC code for every N-th memory location of the new code is stored for the validation purpose. For example, if N is 8, ECC values for memory locations at 8, 16, 24, 48, . . . , etc. are stored.

In one embodiment, memory check logic 105 writes the ECC values into non-volatile memory logic 107 as stored check values. In one embodiment, the new code is written into DDR memory 110 after the ECC values have been computed and stored. Memory check logic 105 then locks non-volatile memory 107.

In one embodiment, during runtime execution, if a read to system memory (e.g., DDR memory 110) falls within a protected memory region (e.g., a firmware shadow region), comparison logic 106 receives an ECC value (computed and stored by memory check logic 105) for every N-th memory location read from the system memory. In one embodiment, comparison logic 106 compares the computed ECC value with the corresponding ECC value stored on non-volatile memory 107. If the comparison results in an ECC mismatch, the system detects an error.

In one embodiment, multiplexer counter 104 and multiplexer 109 are configurable to selectively choose ECC values stored on non-volatile memory 107 and ECC Values stored on the ECC portion of DDR memory 110 to perform ECC checking Multiplexer counter 104 sends a signal to multiplexer 109 via output select 122. Multiplexer 109 sends enable signal 121 to comparison logic 106. In one embodiment, enable signal 121 is asserted, for example, every N count(s).

In one embodiment, security logic (not shown) stalls/throttles a system from executing the firmware or from booting. Security logic prevents processor 111 from executing code in the protected memory regions if comparison logic 106 detects a mismatch between the stored check values and the generated check values. In one embodiment, security logic sends boot throttling signal 120 to processor 111. In one embodiment, an error message is also generated. In one embodiment, a system initiates a reload of the affected content (e.g., firmware). In one embodiment, if no ECC error is detected, a system proceeds to execute the firmware until completion or until an ECC error is detected.

In one embodiment, comparison logic 106 validates check values for selective memory locations in a protected memory region. In one embodiment, comparison logic 106 validates a check value associated with every N-th memory location in a protected memory region. N is determined based on a protection setting.

In one embodiment, comparison logic 106 determines which memory locations in a protected memory region are to be validated. In one embodiment, comparison logic 106 skips validation of check values for (N−1) memory locations in each N memory locations of a protected memory region. In one embodiment, comparison logic 106 performs validation if the address of a memory location is a multiple of N or is a modulo N. In one embodiment, the value N is determined in conjunction with a power saving profile, an operating system, a user configuration setting, or combinations thereof.

In one embodiment, a protected memory region is associated with a smaller N value so that more memory locations in the protected memory region are to be validated. In one embodiment, the protected memory region associated with a smaller N value is for use to store code with high security requirements.

As not all memory location in a protected memory region requires check value validation, this reduces the amount of ECC values to be stored into non-volatile memory 107. For example, if an 8-bit ECC value is computed for a 64-bit memory location and if ECC validation is performed on every memory location of a 64 MB memory region, 8 MB of non-volatile memory 107 will be used to store the ECC values. Contrastingly, if ECC values are checked for every 8-th memory location read from a protected memory region, 1 MB of non-volatile memory 107 will be used to protect a 64 MB memory region. Validating every N-th memory location provides significant protection for the contents in a protected memory region. For example, it is very unlikely that a compromised firmware has identical contents similar to the original firmware in every N-th memory line.

In one embodiment, memory check logic 105, in conjunction with comparison logic 106, enables memory controller 102 to protect the firmware or critical segments of codes from being modified (by computer virus or by unauthorized persons), when the codes are being executed in DDR memory 110.

In one embodiment, memory check logic 105, in conjunction with comparison logic 106, protects the integrity of firmware or critical operating system codes and increases the robustness of systems design. In one embodiment, memory check logic 105, in conjunction with comparison logic 106, protects a larger segment of code in DDR memory 110 by using less amount of non-volatile memory 107.

In one embodiment, memory check logic 105, in conjunction with comparison logic 106, dynamically adjusts the amount of protection segment and scales the size of protected memory. This provides flexibility to the size of protected software and drivers while maintaining sufficient level of protection against malicious attacks.

In one embodiment, a computer system may be configured to support operation in a secure system environment, according to any known approach. A secure system environment may include a trusted partition and an un-trusted partition. The bare platform hardware of the system and trusted software may be included in the trusted partition. Direct access from the un-trusted partition to the resources of the trusted partition may be prevented.

The method and apparatus described herein are primarily discussed in reference to a computer system with processor 111. However, the method and apparatus may be implemented on or in association with any other computer system. In addition to multi-core processor computer systems, the method and apparatus may be implemented on or in association with any integrated circuit device or system, such as cell phones, personal digital assistants, embedded controllers, mobile platforms, desktop platforms, and server platforms, as well as in conjunction with other resources, such as hardware/software threads.

Moreover, the method and apparatus may be implemented in conjunction with a memory location, a memory line, a memory block, a memory word, or any combinations thereof.

Figure 2:
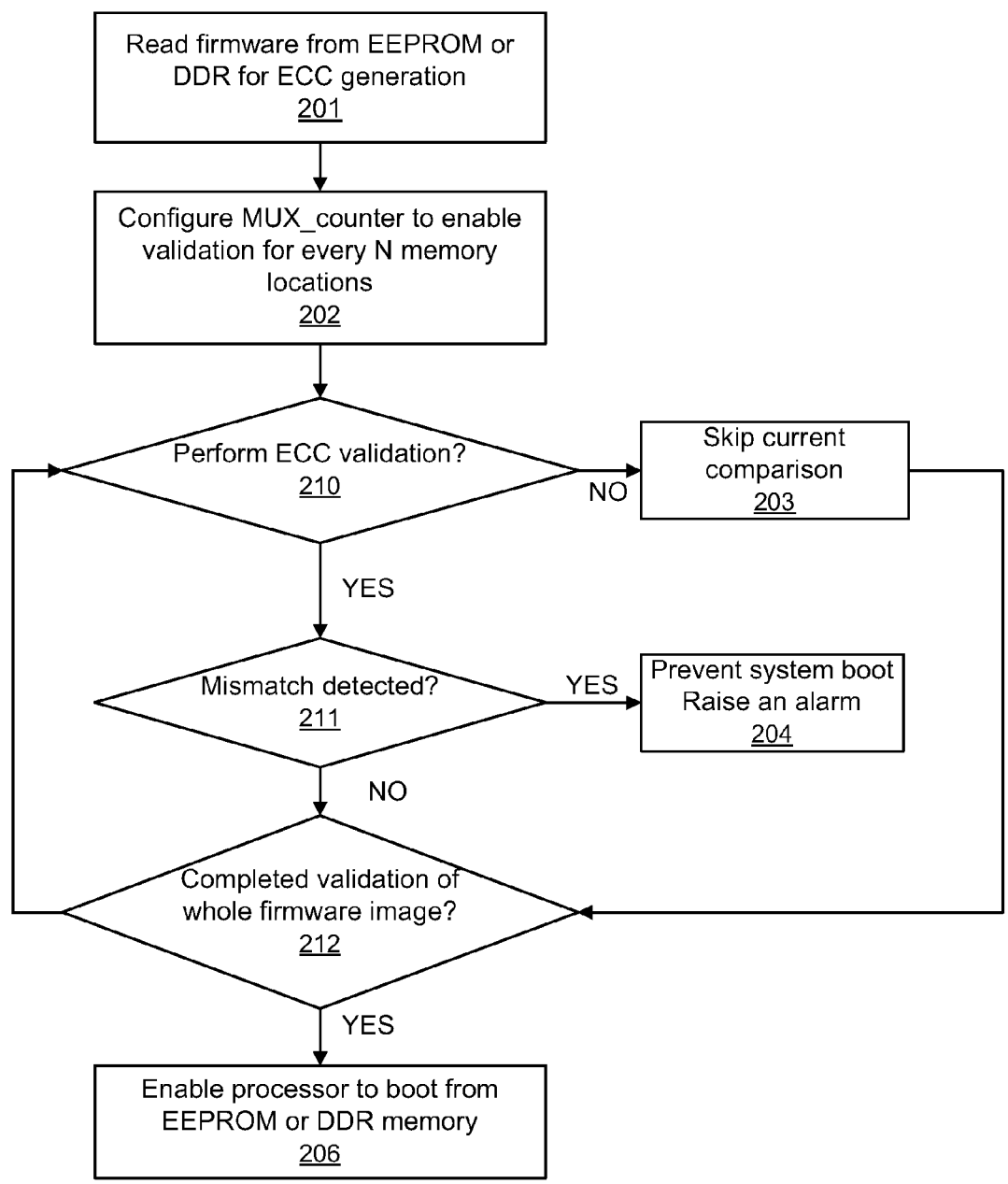
FIG. 2 is a flow diagram of one embodiment of a process to detect potentially tampering of a protected memory region.

FIG. 2 is a flow diagram of one embodiment of a process to detect potentially tampering of a protected memory region. The process is performed by processing logic that may comprise hardware (circuitry, dedicated logic, etc.), software (such as one that is run on a general purpose computer system or a dedicated machine), or a combination of both. In one embodiment, the process is performed in conjunction with a memory controller (e.g., memory controller 102 with respect to FIG. 1). In one embodiment, the process is performed by a computer system with respect to FIG. 4.

Referring to FIG. 2, in one embodiment, processing logic begin by reading firmware from an EEPROM for ECC generation (process block 201). In one embodiment, the firmware is read from a system memory if the system is booting from the system memory and the firmware has been previously loaded into the system memory.

In one embodiment, processing logic configures validation for every N memory locations based on a protection setting (process block 202). In one embodiment, processing logic configures a multiplexer counter to enable the counting of N value.

In one embodiment, processing logic determines whether or not to perform ECC validation with respect to a memory location (process block 210). In one embodiment, processing logic performs a validation by comparing a generated ECC value with a corresponding stored ECC value. The stored ECC value is stored in a non-volatile memory.

In one embodiment, processing logic skips the current comparison if no validation is required for the memory location and continues with the subsequent memory location in the protected memory region (process block 203).

In one embodiment, processing logic determines, based on a comparison result, whether there is a mismatch between the generated ECC value and the stored ECC value (process block 211).

In one embodiment, if a mismatch is detected, processing logic prevents system boot or firmware execution and raises an alert (process block 204). In one embodiment, a system boot has been stalled or throttled at the beginning. Processing logic continues to stall the system boot process if processing logic detects a mismatch. In one embodiment, if a mismatch is detected, processing logic prevents firmware execution if the firmware is executing in a runtime environment.

In one embodiment, processing logic determines whether the protected memory region has been completely loaded (process block 212). In one embodiment, in a real time processing environment, if firmware has been completely loaded into the memory, processing block 212 and processing block 206 will not be included.

In one embodiment, if the protected memory region has been loaded completely and no mismatch is detected, processing logic enables a processor to boot from the EEPROM or the system memory (process block 206).

In one embodiment, processing logic proceeds with code execution for each memory location that has been validated rather than waiting the validation of the entire protected memory region to complete.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 3:
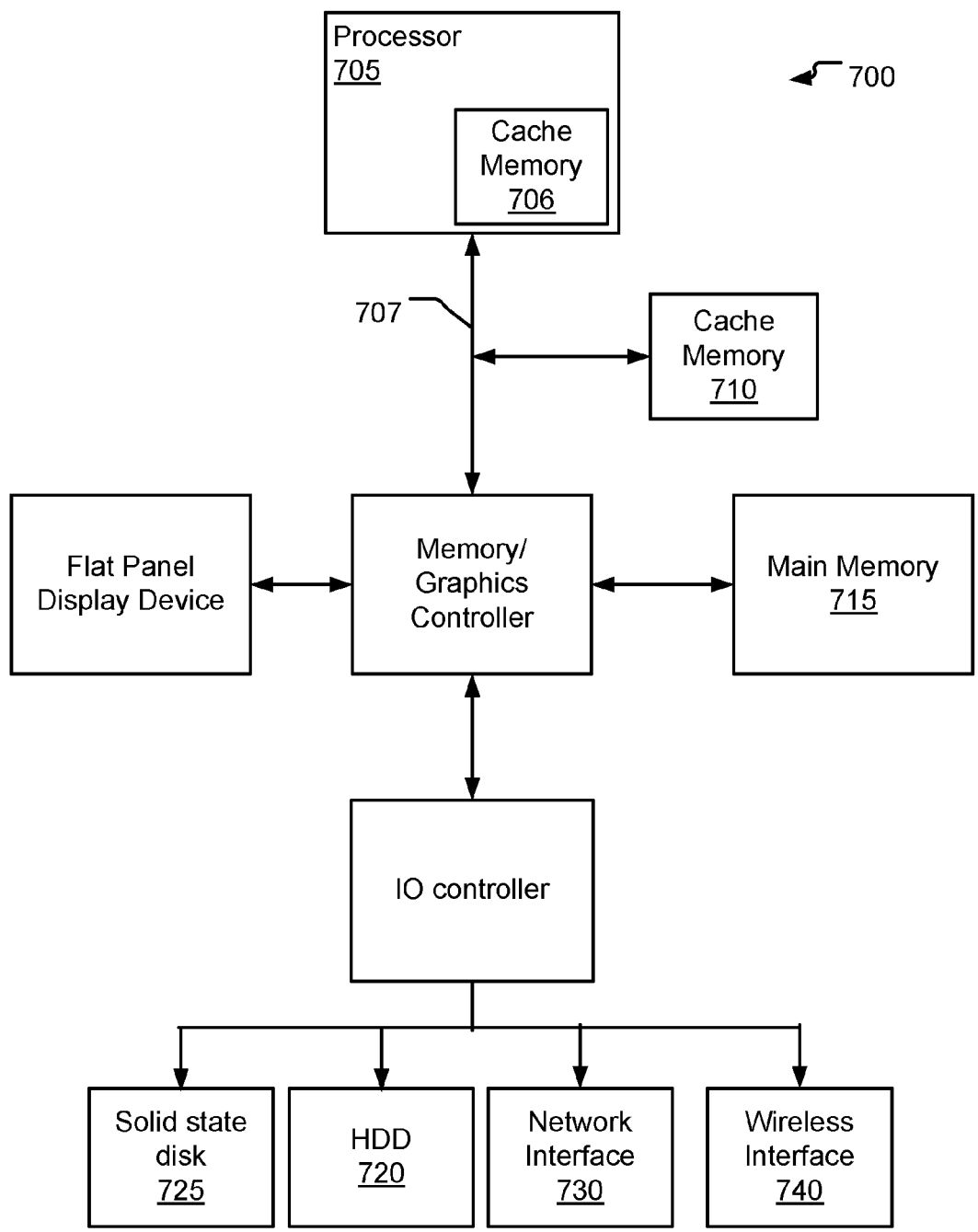
FIG. 3 illustrates a computer system for use with one embodiment of the present invention.

FIG. 3, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 3. Furthermore, in other embodiments of the invention may be distributed throughout several circuits, logic units, or devices illustrated in FIG. 3.

Figure 4:
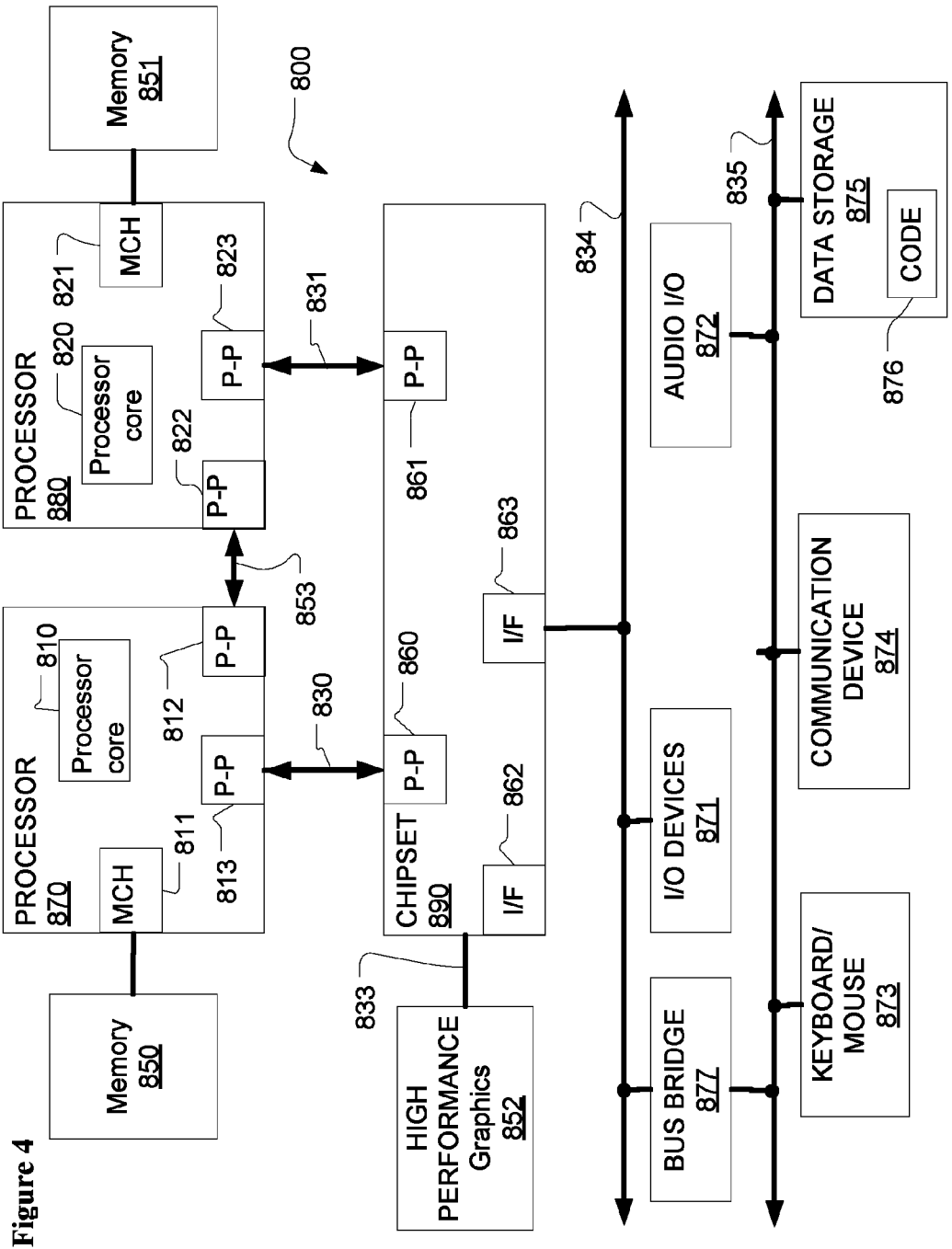
FIG. 4 illustrates a point-to-point computer system for use with one embodiment of the invention.

Similarly, at least one embodiment may be implemented within a point-to-point computer system. FIG. 4, for example, illustrates a computer system that is arranged in a point-to-point (PtP) configuration. In particular, FIG. 4 shows a system where processors, memory, and input/output devices are interconnected by a number of point-to-point interfaces.

The system of FIG. 4 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or within data storage 875, or within memory 850 of FIG. 4.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus, comprising:
    memory check logic circuitry to generate first error checking information from program code after the program code has been loaded into a protected region of a system memory and during execution of the program code from the protected region of the system memory, wherein the memory check logic circuitry is to calculate the first error checking information from the protected region of system memory for every Nth memory location; and comparison logic circuitry comprising a first input and a second input, the first input to receive the first error checking information, the second input to receive second error checking information, the second error checking information retrieved from a non volatile memory and including an image of the program code, the comparison logic circuitry to generate an error signal if the comparison logic circuitry detects a mismatch between the first error checking information and the second error checking information; and, circuitry to generate the second error checking information in response to an update of the program code prior to the loading and execution of the program code and to store the second error checking information in the non volatile memory.

2. The apparatus of claim 1 wherein the system memory comprises a volatile memory.

3. The apparatus of claim 1 wherein the program code comprises one or more of:
firmware;
BIOS;
a boot loader;
a manageability engine;
a driver; and
an OS kernel.

4. The apparatus of claim 1 wherein the error signal is to stall and/or throttle execution of the program code from system memory.

5. The apparatus of claim 1 wherein the memory check logic circuitry and the comparison logic circuitry are integrated into a memory controller.

6. A computing system, comprising:
a) a plurality of processing cores;
b) a system memory, the system memory to include protected regions;
c) a memory controller coupled between one or more of the plurality of processing cores and the system memory, the memory controller further comprising:
i) memory check logic circuitry to generate first error checking information from program code after the program code has been loaded into a protected region of the system memory and during execution of the program code from the protected region of the system memory, wherein the memory check logic circuitry is to calculate the first error checking information from the protected region of system memory for every Nth memory location; and
ii) comparison logic circuitry comprising a first input and a second input, the first input to receive the first error checking information, the second input to receive second error checking information, the second error checking information retrieved from a non volatile memory and including an image of the program code, the comparison logic circuitry to generate an error signal if the comparison logic circuitry detects a mismatch between the first error checking information and the second error checking information;
iii) circuitry to generate the second error checking information in response to an update of the program code prior to the loading and execution of the program code and to store the second error checking information in the non volatile memory.

7. The computing system of claim 6 wherein the system memory comprises volatile memory.

8. The computing system of claim 6 wherein the program code comprises one or more of:
firmware;
BIOS;
a boot loader;
a manageability engine;
a driver; and
an OS kernel.

9. The computing system of claim 6 wherein the error signal is to stall and/or throttle execution of the program code from system memory.

10. The computing system of claim 6 wherein the memory check logic circuitry and the comparison logic circuitry are integrated into a memory controller.

11. A method, comprising:
generating second error checking information in response to an update of program code prior to the loading and execution of the program code;
storing the second error checking information in a non volatile memory;
loading the program code into a protected region of system memory and executing the program code from the protected region of system memory;
detecting a read of the program code that is executing from the protected region of system memory;
calculating first error checking information from the program code read from the protected region of system memory for every Nth memory location;
reading the second error checking information for the program code from the non volatile memory
comparing the first error checking information with the second error checking information; and,
generating an error signal in response to the comparing resulting in a mismatch.

12. The method of claim 11 further comprising throttling and/or stalling execution of the program code in response to the error signal.

13. The method of claim 11 wherein the program code comprises one or more:
firmware;
BIOS;
a boot loader;
a manageability engine;
a driver; and
an OS kernel.

14. The method of claim 11 wherein the detecting, calculating, comparing and generating are performed by a memory controller.

15. The method of claim 14 wherein the reading of second error checking information is performed by the memory controller.

16. The method of claim 11 wherein the system memory comprises volatile memory.

* * * * *